United States Patent
Heger et al.

(10) Patent No.: US 6,435,785 B1
(45) Date of Patent: Aug. 20, 2002

(54) VEHICLE TRANSPORTER HAVING RESILIENTLY-BIASED LOCKING SYSTEM

(75) Inventors: Paul J. Heger, Portland; Robert D. Boydstun, IV, Clackamas, both of OR (US)

(73) Assignee: Boydstun Metal Works Inc., Portland, OR (US)

( * ) Notice: Subject to any disclaimer, the term of this patent is extended or adjusted under 35 U.S.C. 154(b) by 0 days.

(21) Appl. No.: 09/801,505

(22) Filed: Mar. 7, 2001

(51) Int. Cl.[7] .................................................. B60P 9/00
(52) U.S. Cl. ........................... 410/29.1; 410/24; 410/26
(58) Field of Search ................................ 410/4, 24, 26, 410/29.1; 254/16; 248/354.4, 354.5; 187/207, 234

(56) References Cited

U.S. PATENT DOCUMENTS

| | | |
|---|---|---|
| 2,492,829 A | 12/1949 | Baker |
| 3,650,416 A | 3/1972 | Bodenheimer .............. 410/29.1 |
| 3,709,467 A | 1/1973 | Mann |
| 3,749,361 A | 7/1973 | Johnson |
| 3,880,457 A | 4/1975 | Jones, Jr. .................... 410/29.1 |
| 3,931,895 A | 1/1976 | Grimaldo |
| 4,119,042 A | 10/1978 | Naves et al. |
| 4,150,851 A | 4/1979 | Cienfuegos |
| 4,172,612 A * | 10/1979 | Kinard ....................... 410/29.1 |
| 4,238,168 A | 12/1980 | Naves ......................... 410/27 |
| 4,255,069 A | 3/1981 | Yielding |
| 4,369,008 A * | 1/1983 | Cooper ...................... 410/29.1 |
| 4,668,141 A | 5/1987 | Petersen ....................... 410/12 |
| 4,668,142 A | 5/1987 | Fity et al. ..................... 410/26 |
| 4,789,281 A | 12/1988 | Westerdale ................ 410/29.1 |
| 4,881,859 A | 11/1989 | Ehrlich ..................... 410/29.1 |
| 5,020,960 A | 6/1991 | Provenson |
| 5,071,298 A | 12/1991 | Conzett ....................... 410/27 |
| 5,286,149 A | 2/1994 | Seay et al. .................... 410/26 |
| 5,332,345 A * | 7/1994 | Lillard ...................... 410/29.1 |
| 5,462,380 A | 10/1995 | Peek et al. |
| 5,676,507 A * | 10/1997 | Lugo ......................... 410/29.1 |
| 5,755,540 A | 5/1998 | Bushnell ................... 410/29.1 |
| 6,058,885 A | 5/2000 | Putze |
| 6,116,183 A | 9/2000 | Crow et al. |

FOREIGN PATENT DOCUMENTS

JP       5650886      5/1981

* cited by examiner

*Primary Examiner*—Stephen T. Gordon
(74) *Attorney, Agent, or Firm*—Chernoff, Vilhauer, McClung & Stenzel

(57) ABSTRACT

A vehicle transporter having a vehicular frame with at least one vehicle support member movable by a lifting motor along a structural member between different elevations. At least one locking member interacts between the vehicle support member and the structural member, the locking member having a locked position preventing movement of the vehicle support member along the structural member, and an unlocked position permitting such movement. A resiliently-yieldable biasing device is selectively operable by a controller to urge the locking member resiliently at least toward the unlocked position, and preferably alternatively toward the locked position as well.

10 Claims, 5 Drawing Sheets

VEHICLE TRANSPORTER HAVING RESILIENTLY-BIASED LOCKING SYSTEM

BACKGROUND OF THE INVENTION

The present invention relates to vehicle transporters, such as trucks, trailers, railcars and the like, which have vehicle support members lockable at different elevations on the transporter.

Conventional vehicle transporters are normally equipped with vehicle support members movable between different elevations by means of lifting motors such as fluid power cylinder assemblies. Vehicle transporters of this type, such as truck/trailer combinations, are capable of elevating and orienting numerous automobiles in tightly stacked configurations to maximize the payload. However, a significant drawback of such transporters is the time required to lock each vehicle support member in its elevated position during loading of the transporter, and to unlock each support member during unloading. These tasks normally require manual insertion of individual locking pins into the transporter structural members after the vehicle support members have been raised to their desired elevated positions during loading of the transporter, and manual removal of such pins prior to lowering the vehicle support members during unloading. The pin locations may be as high as twelve feet off the ground, requiring the operator to climb up onto the transporter to access the pins for insertion or removal. Adding to the time consumption is the fact that the pins can be inserted to lock the vehicle support members only if pin-receiving holes are first properly aligned by the lifting motors. Moreover, the pins can be removed to unlock the vehicle support members only if the weight of the support members has been adequately removed from the pins by the lifting motors. This requires careful coordination between the control of the lifting motors at ground level and the manipulation of the pins at elevated positions.

In addition to the excessive time required to insert and remove the manual locking pins, a further drawback to their use is the possibility that a fluid cylinder may fail while the associated vehicle support member is elevated, either before a locking pin has been inserted during the loading process, or after a locking pin has been removed during the unloading process. In such case, workmen in close proximity to the elevated vehicles during the loading and unloading processes are susceptible to injury.

The foregoing problems are not solved by the conventional expedient of simply spring-biasing the pins toward their locked positions, because manual manipulation of the pins at high elevations would still be required. Locking systems such as those described in the Background of the Invention and Description of the Preferred Embodiment of U.S. Pat. No. 5,755,540, which is incorporated herein by reference, can solve some of the foregoing problems by their remote operation of locks. However, they cannot apply a resilient force to unlock a locking member, nor can they provide the economical reliability of a simple manual system.

BRIEF SUMMARY OF THE INVENTION

To solve the foregoing problems, a vehicle transporter is provided which has a frame with at least one vehicle support member movable by a lifting motor along a structural member between different elevations. At least one locking member interacts between the vehicle support member and the structural member, the locking member having a locked position preventing movement of the vehicle support member along the structural member, and an unlocked position permitting such movement. A resiliently-yieldable biasing device is selectively operable by a controller to urge the locking member resiliently at least toward the unlocked position, and preferably alternatively toward the locked position as well.

The foregoing and other objectives, features, and advantages of the invention will be more readily understood upon consideration of the following detailed description, taken in conjunction with the accompanying drawings.

DETAILED DESCRIPTION OF THE PREFERRED EMBODIMENT

Figure 1:
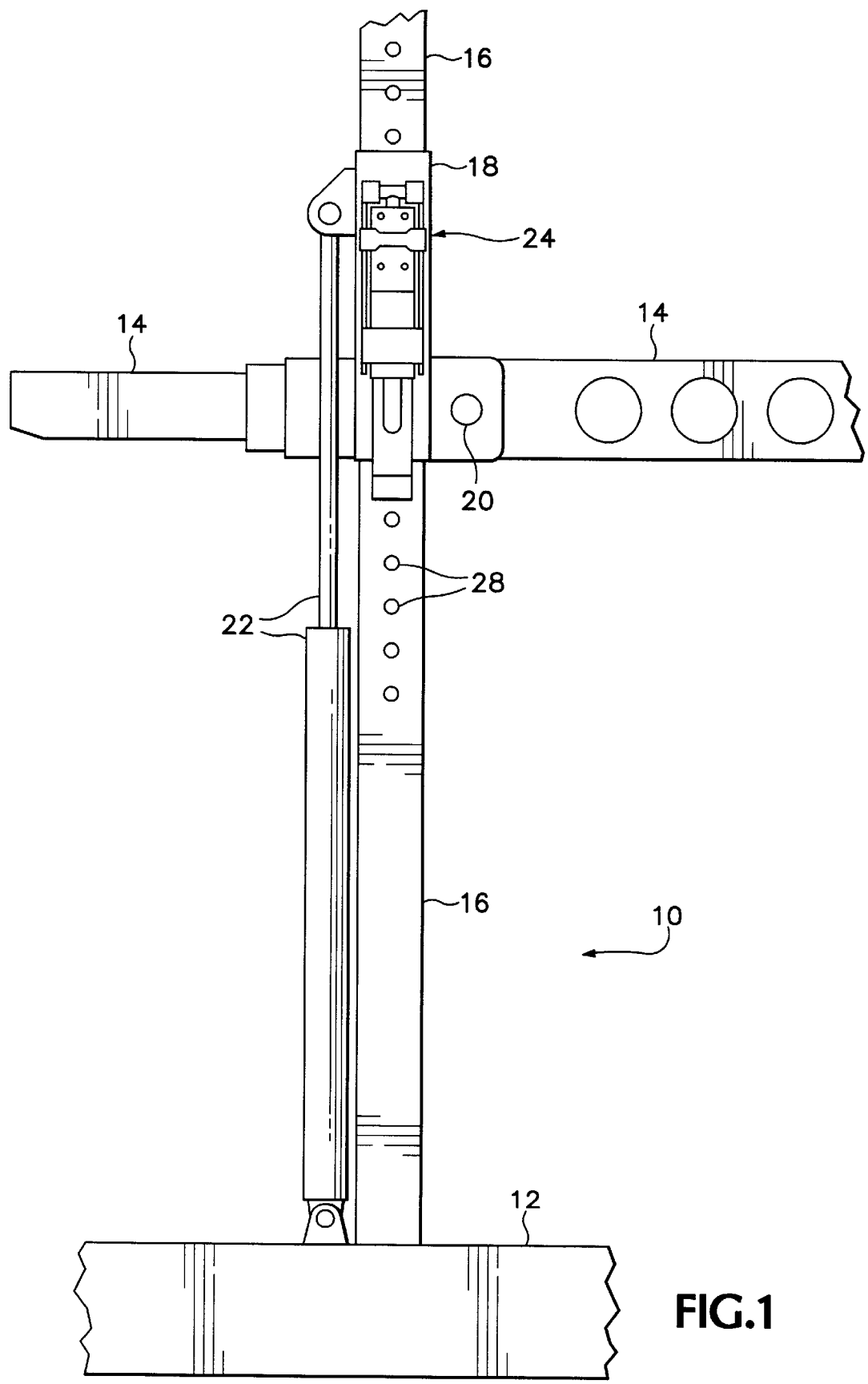
FIG. 1 is a partial side view of a vehicle transporter having an exemplary embodiment of a locking system in accordance with the present invention.

An exemplary vehicle transporter indicated generally as 10 in FIG. 1, such as an automobile-carrying truck, trailer, railcar, etc., comprises a vehicular frame 12 having at least one vehicle support member 14 for supporting a vehicle at varying elevations on at least one structural member 16 mounted on the frame 12. The vehicle support member 14 includes a sleeve 18, attached by a pivot pin 20 to the remainder of the support member. The sleeve 18 slidably engages the structural member 16 so that the support member 14 is movable between different elevations along the structural member 16 under the control of a lifting motor 22 such as a fluid power cylinder assembly.

The present invention can be incorporated into many alternative configurations of vehicle transporters, having diverse arrangements of vehicle support members as shown, for example, in U.S. Pat. Nos. 2,492,829, 3,650,416, 3,931, 895, 4,668,141, 4,668,142, 4,789,281, 5,071,298, 5,286,149, and 5,755,540, all of which are incorporated herein by reference. Any alternative configuration of a vehicle transporter capable of being modified advantageously to incorporate the principles of the present invention, as so modified, is intended to be within the scope of the present invention.

Figure 3:
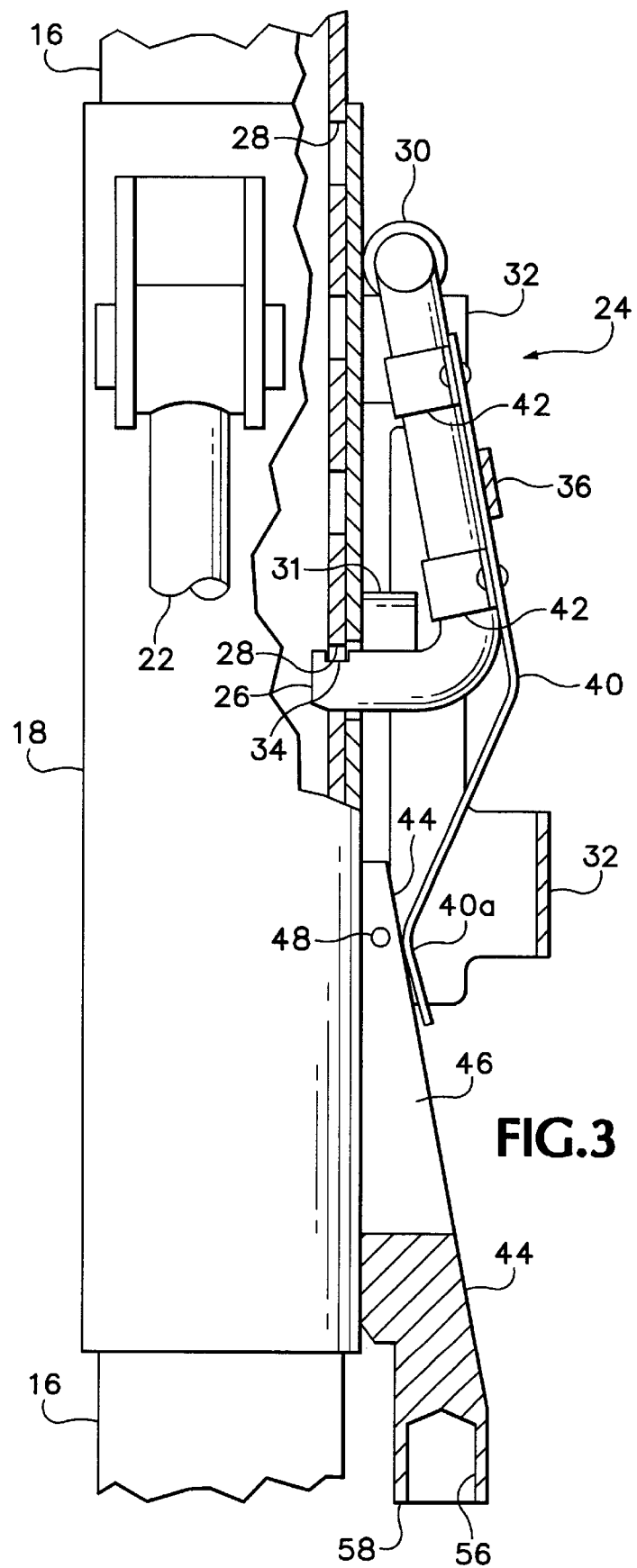
FIG. 3 is a side sectional view of the locking system as shown in FIG. 2.
Figure 5:
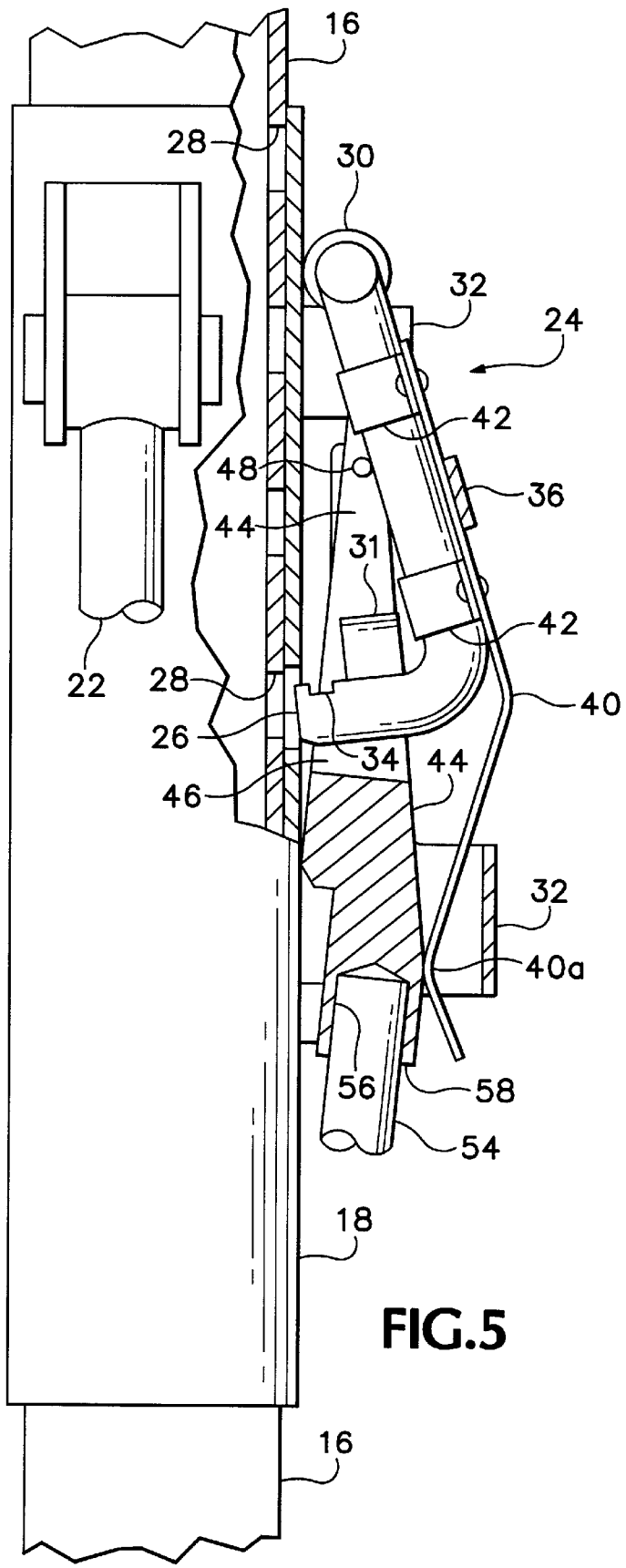
FIG. 5 is a side sectional view of the locking system as shown in FIG. 4.

Mounted on the sleeve 18 is a locking assembly, indicated generally as 24, having a locking member 26 which interacts between the sleeve 18 of the vehicle support member 14 and a series of locking apertures 28 in the structural member 16. The locking member 26 pivots about a journal assembly 30, located on the top of the locking assembly frame 32, between a locked position and an unlocked position. In the locked position, the locking member 26 is inserted in one of the apertures 28 to the extent permitted by a stop 31 as shown in FIG. 3 to prevent movement of the vehicle support member 14 along the structural member 16. In the unlocked position, the locking member 26 is withdrawn from the aperture as shown in FIG. 5 to permit such movement. When the weight of the vehicle support member 14 is exerted downwardly on the locking member 26 in its locked position, the downward force tends to pivot the locking member about the journal assembly 30 toward the aperture 28 to prevent inadvertent unlocking. Conversely, when the lifting motor 22 exerts an upward force on the locking member 26 in its locked position, a notch 34 on the locking member prevents such upward force from inadvertently pivoting the locking member out of the aperture 28.

A resiliently-yieldable biasing device on the locking assembly 24 is selectively operable to urge the locking member 26 alternatively either toward its locked position or toward its unlocked position. Preferably the biasing device comprises a first resiliently yieldable component which urges the locking member resiliently toward its locked position, and a second resiliently-yieldable component which urges the locking member resiliently toward its unlocked position. The first resiliently-yieldable component is preferably an elastomeric band 36 connected by pins such as 38 to the frame 32 of the locking assembly 24 so as to exert an inward resiliently-yieldable urging force on the locking member 26. The second resiliently-yieldable component is preferably a leaf spring 40 rigidly connected by metal straps 42 to the locking member 26 so as to exert an outward resiliently-yieldable urging force on the locking member. Alternatively, the two components could be different parts or modes of the same resiliently-yieldable member.

A controller, preferably in the form of a cam 44, is operable to select whether the biasing device urges the locking member 26 toward the locked position or toward the unlocked position. The cam is in the form of a wedge-shaped clevis having a vertical slot 46 which loosely surrounds the locking member 26. The cam 44 is vertically slidable within the locking assembly frame 32 between a lowered position, shown in FIGS. 1–3, and a raised position shown in FIGS. 4–5. When in its lowered position, the cam is retained by a pair of roll pins such as 48 which interfere with a pair of ledges such as 50 at the bottom of the frame 32 of the locking assembly, preventing the cam 44 from dropping downwardly out of the frame. In its alternative raised position, the cam 44 is retained from downward movement by interference between the same roll pins 48 and respective hooks such as 52 on opposite sides of the frame of the locking assembly.

Figure 2:
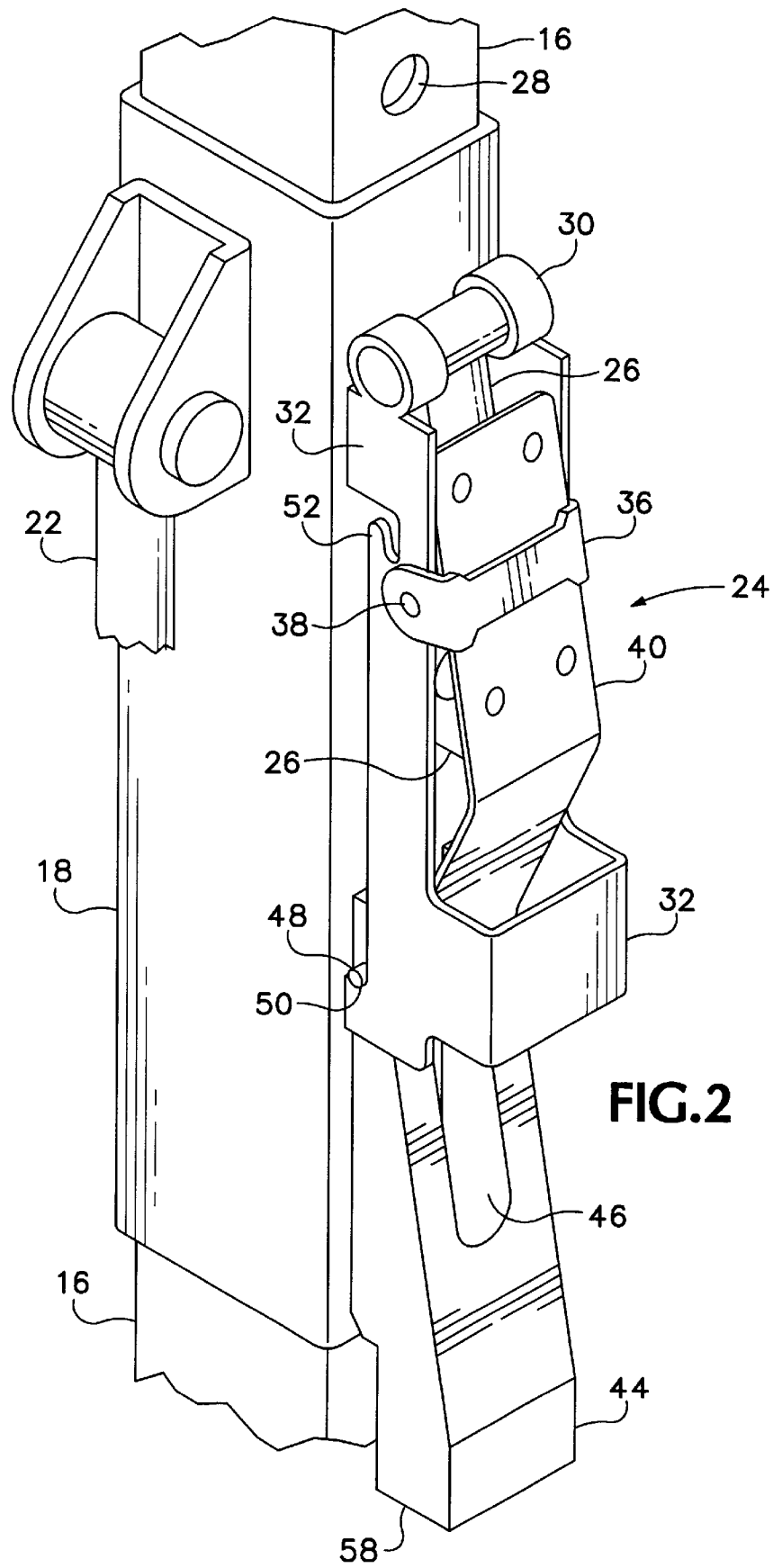
FIG. 2 is an enlarged perspective view of the locking system of FIG. 1, with the locking member shown in its locked position.
Figure 4:
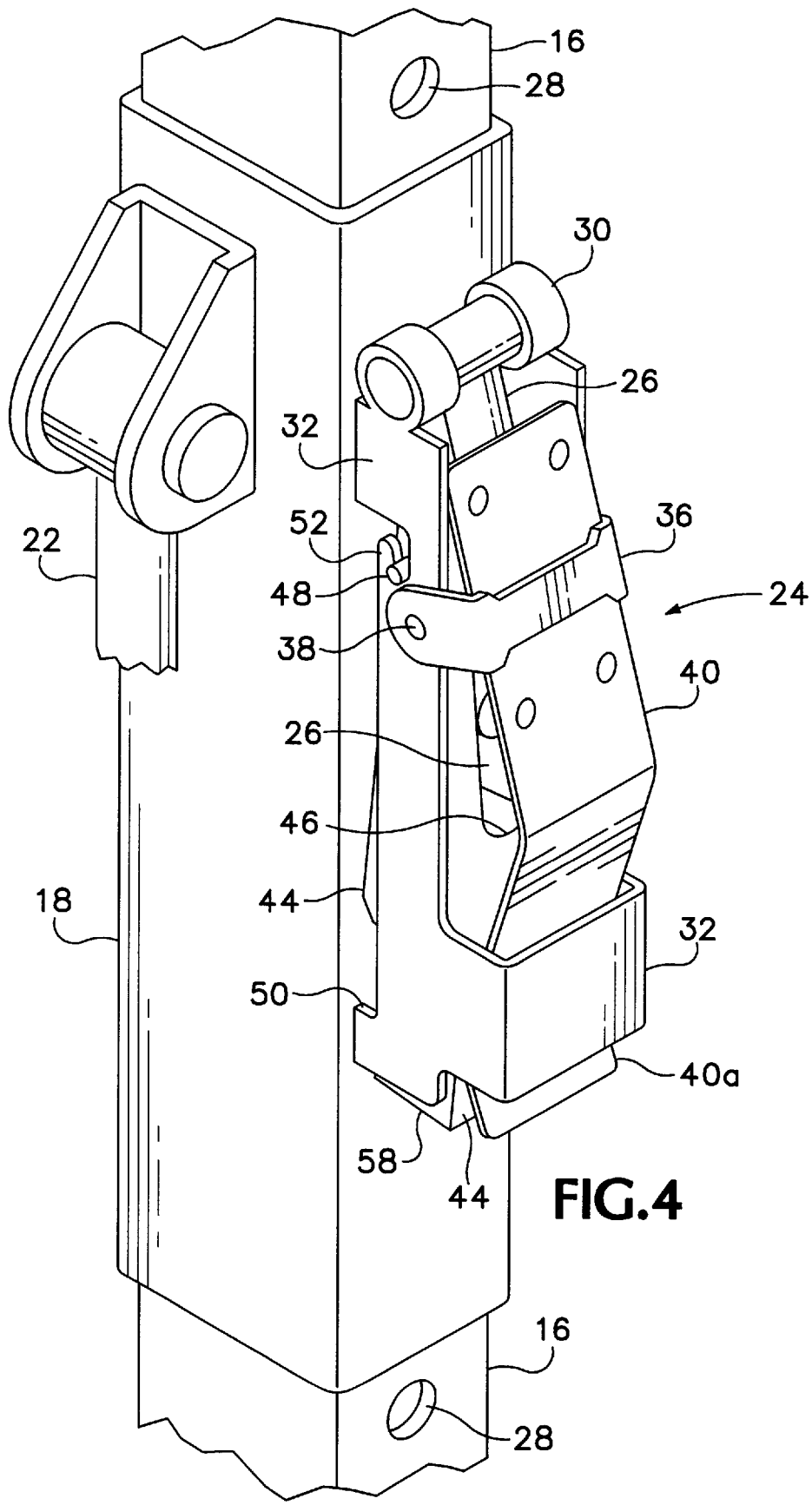
FIG. 4 is an enlarged perspective view of the locking system of FIG. 1, with the locking member shown in its unlocked position.

When the cam 44 is in its lowered position as shown in FIGS. 1–3, the base 40a of the leaf spring 40 is permitted to move inwardly by the thinner cross section near the top of the cam 44 against which the base of the leaf spring bears. This reduces or eliminates the leaf spring's resiliently-yieldable resistance to the inward pivoting of the locking member 26 toward its locked position, thereby enabling the elastomeric band 36 to resiliently urge the locking member 26 inwardly toward its locked position. Conversely, when the cam 44 is in its raised position as shown in FIGS. 4–5, the base 40a of the leaf spring 40 is pushed outwardly by the thicker cross section near the bottom of the cam, thereby causing the leaf spring to resiliently urge the locking member 26 outwardly toward its unlocked position with an urging force that opposes and overcomes that exerted by the elastomeric band 36.

Movement of the cam 44 between its lowered and raised positions can be accomplished remotely by an operator standing at ground level. For example, the operator can insert a tool, such as a tie-down bar 54 or similar implement, matingly into a cavity 56 formed in a downwardly-facing surface 58 at the bottom of the cam 44. If the cam is in its lowered position, the operator can push the bar 54 upwardly and slightly inwardly until the roll pins 48 catch the hooks 52 on the locking assembly frame, thereby causing the leaf spring 40 to resiliently urge the locking member 26 outwardly toward its unlocked position. Conversely, if the cam 44 is in its raised position, the operator can insert the bar 54 and momentarily lift it upwardly and slightly outwardly to release the roll pins 48 from the hooks 52, and then allow the cam to slide downwardly by gravity until intercepted by the ledges 50 so as to relieve the outward resilient urging force exerted by the leaf spring 40 and permit the elastomeric band 36 to resiliently urge the locking member 26 inwardly toward its locked position. The operator may thus accomplish the foregoing selection process remotely without any need to climb to a higher elevation to manually control the locking system.

In operation, when the operator wishes to unlock the vehicle support member 14 to adjust its elevation, he pushes the cam 44 to its raised position as described above and then operates the lifting motor 22 to relieve the weight on the locking member 26, which enables the leaf spring 40 to resiliently snap the locking member 26 out of the aperture 28 automatically in response to the weight-relieving actuation of the lifting motor 22. The operator then uses the lifting motor 22 to raise or lower the vehicle support member 14 to the desired location and, when such location is approximately reached, the operator releases the cam 44 from its raised position as described above and allows it to drop to its lowered position. He then operates the lifting motor 22 to align an aperture 28 with the locking member 26, which enables the elastomeric band 36 to resiliently snap the locking member 26 into the aperture 28 automatically in response to the aligning actuation of the lifting motor 22. If an aperture 28 on only one side of the vehicle support member 14 becomes aligned with its locking member 26, the operator can continue to lift the support member 14 to achieve alignment on the other side of the vehicle support member without inadvertently unlocking the first side with the lifting force, due to the retaining function of the notch 34 on the first side as explained previously.

Besides hydraulic or pneumatic fluid-power cylinder assemblies, other types of rotary or linear lifting motors 22, including electric, can be used. Such motors can be outside or inside their associated structural members or can be integral with the structural members.

The locking member 26 of the locking assembly can, for example, be a pin, hook, lug or the like, and may move linearly or pivotally to interact with an aperture, recess, ledge, groove or the like formed in the structural member 16. The locking member could also have multiple locking components instead of a single locking component as shown.

The biasing device may have one or more springs or other resilient materials acting in compression or tension, such as leaf springs, coil springs, torsion springs, elastomeric tension members, compressive elastomeric foam members, or the like.

The controller for the biasing device can be a cam or any other suitable mechanism actuated by manual power, as shown, or by motorized power from an electrical or fluid-powered actuator. Actuation can be remote or nonremote, depending upon the needs of the system. Movement of the controller can be linear, as shown, or rotary.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A vehicle transporter comprising:
   (a) a vehicular frame having at least one vehicle support member movable between different elevations along at least one structural member mounted on said frame;
   (b) at least one lifting motor capable of moving said support member between said different elevations;
   (c) at least one locking member interacting between said vehicle support member and said structural member, said locking member having a locked position preventing movement of said vehicle support member along said structural member and an unlocked position permitting movement of said vehicle support member along said structural member;
   (d) a resiliently-yieldable biasing device selectively operable to urge said locking member resiliently toward said locked position and, alternatively, resiliently toward said unlocked position; and
   (e) a controller operable to select whether said biasing device urges said locking member resiliently toward said locked position or toward said unlocked position.

2. The apparatus of claim 1 wherein said biasing device is selectively operable to move said locking member resiliently from said locked position to said unlocked position.

3. The apparatus of claim 1 wherein said locking member is mounted on said vehicle support member so as to move in unison therewith between said different elevations, and move with respect thereto toward said locked position and toward said unlocked position.

4. The apparatus of claim 1 wherein said biasing device is mounted on said vehicle support member so as to move in unison therewith between said different elevations.

5. The apparatus of claim 1 wherein said biasing device comprises at least two respective resilient components each capable of applying a resilient urging force on said locking member opposite to that applied by the other component, at least one of said resilient components being adjustable by said controller so as to change its urging force.

6. The apparatus of claim 1 wherein said controller is movable between different elevations relative to said structural member so as to select whether said biasing device urge said locking member toward said locked position or toward said unlocked position.

7. The apparatus of claim 1 wherein said controller has a downwardly-facing surface engageable to move said controller so as to select whether said biasing device urges said locking member toward said locked position or toward said unlocked position.

8. A vehicle transporter comprising:
   (a) a vehicular frame having at least one vehicle support member movable between different elevations along at least one structural member mounted on said frame;
   (b) at least one lifting motor capable of moving said support member between said different elevations;
   (c) at least one locking member interacting between said vehicle support member and said structural member, said locking member having a locked position preventing movement of said vehicle support member along said structural member and an unlocked position permitting movement of said vehicle support member along said structural member;
   (d) said locking member being selectively movable resiliently at least to said unlocked position in response to actuation of said lifting motor.

9. The apparatus of claim 8, said locking member alternatively being selectively movable resiliently to said locked position in response to actuation of said lifting motor.

10. The apparatus of claim 8 wherein said locking member is mounted on said vehicle support member so as to move in unison therewith between said different elevations, and move with respect thereto toward said locked position and toward said unlocked position.

* * * * *